United States Patent [19]

Scheiner et al.

[11] 3,755,106

[45] Aug. 28, 1973

[54] ELECTROLYTIC OXIDATION OF $Sb_2S_3$

[75] Inventors: Bernard J. Scheiner; Roald E. Lindstrom, both of Reno, Nev.; Thomas A. Henrie, Silver Spring, Md.

[73] Assignee: The United States of America as represented by the Secretary of the Interior, Washington, D.C.

[22] Filed: May 15, 1972

[21] Appl. No.: 232,606

[52] U.S. Cl. ............................. 204/96, 204/105 R
[51] Int. Cl. ........................................... C01b 13/14
[58] Field of Search .......................... 204/105 R, 96

[56] References Cited

UNITED STATES PATENTS

| | | | |
|---|---|---|---|
| 3,673,061 | 6/1972 | Kruesi | 204/105 R |
| 3,657,081 | 4/1972 | Holmes | 204/105 R |
| 3,464,904 | 9/1969 | Brace | 204/105 R |

*Primary Examiner*—John H. Mack
*Assistant Examiner*—R. L. Andrews
*Attorney*—Ernest S. Cohen, and William S. Brown

[57] ABSTRACT $Sb_2S_3$ is converted to $Sb_2O_5$ by electrolysis of a slurry of sulphide in an aqueous solution containing alkali metal chloride, alkali metal bromide, or a mixture of the two.

3 Claims, No Drawings

ELECTROLYTIC OXIDATION OF $Sb_2S_3$

Antimony trisulfide, $Sb_2S_3$, is conventionally recovered from ores by multistage flotation procedures which concentrate the antimony sulfide and eliminate, as much as possible, other minerals. Further processing usually includes roasting to convert the sulfide to oxide, reduction of the oxide to antimony metal by roasting in the presence of soda ash and carbon as a reducing agent, and smelting with sodium chloride and iron followed by further purification to remove the iron. The direct roasting of stibnite has the disadvantage that the oxide formed is not high enough quality to be used in fire retardant paints, the major use of the trivalent oxide. Exception to this is when a very high grade stibnite is used for the roasting. In addition, during practice of the conventional prior art $SO_2$ is formed and is vented to the atmosphere, thereby causing a pollution problem.

It has now been found, according to the process of the invention, that $Sb_2S_3$ can be converted to a hydrated pentoxide by electrolysis of a slurry of the $Sb_2S_3$ in an aqueous solution containing an alkali metal chloride or bromide, or mixture of the two. The thus-formed oxide is insoluble in the aqueous solution and may be readily recovered by conventional means such as filtering, decanting, etc. Conversion of the hydrated oxide to metallic antimony may then be accomplished by conventional techniques such as roasting in the presence of soda ash and carbon as the reducing agent. The antimony metal thus formed can be converted to $Sb_2O_3$ by a controlled roasting process. As mentioned above, the oxide finds utility in paints and fire retardants, while the metal is used in alloys, e.g., in printing type metal, lead storage batteries, bearing metal, etc.

The most common source of antimony is the mineral stibnite; however, other ores, such a livingstonite ($HgS \cdot 2Sb_2S_3$) and tetrahedrite ($4Cu_2S \cdot Sb_2S_3$), may also be used as the starting material in the process of the invention. Where the concentration of $Sb_2S_3$ in the ore is relatively low, initial concentration to a $Sb_2S_3$ content of about 40 to 60 percent may be accomplished by means of conventional techniques such as flotation. Typical flotation procedures consist of grinding the ore, flotation using a variety of collectors, dewatering the concentrate by filtration, and drying to remove the remaining water.

A slurry is prepared from the $Sb_2S_3$ mineral, or ore concentrate, and the brine solution that forms the electrolyte in the process of the invention. This brine solution consists essentially of water containing an alkali metal, preferably sodium or potassium, chloride or bromide, or a mixture thereof, in an amount of about 1 to 20 percent by weight.

The $Sb_2S_3$ mineral or concentrate is employed in a particle size of about 35 to 325 mesh and concentration of about 1 to 20 weight percent solids. A slurry is formed by dispersion of the $Sb_2S_3$ in the brine solution by conventional means, such as stirring.

Oxidation of $Sb_2S_3$ is accomplished by electroysis using a d.c. current in a conventional electrolytic cell. Suitable voltages and current densities for the electrolysis range from about 3 to 5 volts and 0.1 to 1.0 amp/$in^2$, respectively. Ambient temperature and pressure are usually satisfactory, but temperatures up to about 50°C may be used.

Graphite electrodes for both anode and cathode are usually satisfactory; however, other types of electrodes such as lead-dioxide anodes and cathodes of iron and copper may also be used. Suitable electrode spacing is about one-fourth to three-fourths inch. The electrolysis may be carried out in any conventional vessel which is constructed of material resistant to oxidation by acid brines such as a rubber lined agitator tank.

The time required for substantially complete electrolytic conversion of $Sb_2S_3$ to the pentoxide will, of course, vary considerably depending on the type and amount of ore, current density, type and concentration of chloride and bromide electrolytes, etc; however, a period of about 1 to 24 hours is usually sufficient for the conversion.

The hydrated antimony pentoxide product is insoluble in the aqueous brine and is, therefore, readily recovered by any conventional means such as filtration or decantation. The antimony oxide is readily converted to antimony metal by roasting with about 10 weight percent of sodium carbonate as a flux and about 20 weight percent carbon as reducing agent. The process of the invention will be more particularly illustrated by means of the following example:

EXAMPLE 1

An antimony sulfide concentrate containing approximately 62.1 percent Sb, 26.8 percent S, 2.8 percent Si, and 6.1 percent oxygen was slurried with brine solution in the ratio of 200 grams of concentrate to 3 liters of water containing 300 grams of potassium chloride and 30 grams of potassium bromide. Graphite electrodes were immersed in the well-agitated slurry and current passed through the system at a current density of 0.5 amp/$in^2$ for 18 hours. The pH decreased from 7 to 1.6 during the electrolysis. The solution was filtered and the solid antimony oxide residue washed with water to remove residual salt. The composition of the final material was Sb-58 percent, S-2.5 percent, Si-2.3 percent, and oxygen-36.3 percent, and consisted largely of $Sb_2O_5 \cdot nH_2O$. The sulfur content of the oxide material was mostly amphorous sulfur which could be removed by washing with carbon disulfide or other suitable solvent.

EXAMPLE 2

The antimony sulfide concentrate of Example 1 was slurried with brine solution in the ratio of 50 grams of concentrate to 3 liters of water containing 300 grams of sodium chloride. Graphite electrodes were immersed in the slurry and current passed through the system at a current density of 0.5 amp/$in^2$ for 6 hours. The pH decreased from 7 to 1.26 during the electrolysis. The solution was filtered and the solid antimony oxide residue washed to remove residual salt. The composition of the final product was Sb-58 percent, S-3.7 percent, oxygen-36.5 percent, and Si-2.3 percent, and consisted largely of $Sb_2O_5 \cdot nH_2O$.

We claim:

1. A process for conversion of antimony trisulfide to antimony pentoxide comprising preparing a slurry of the trisulfide in an aqueous solution of about 1 to 20 percent by weight of an alkali metal chloride, an alkali metal bromide, or a mixture of the two, and electrolyzing the slurry between an anode and a cathode, using direct current, at a temperature not in excess of 50°C and a current density of about 0.1 to 1.0 amp/$in^2$ for about 1 to 24 hours, whereby an insoluble hydrated pentoxide is formed.

2. The process of claim 1 in which the alkali metal is sodium.

3. The process of claim 1 in which the alkali metal is potassium.

* * * * *